April 25, 1967  G. R. ADAMS ETAL  3,315,860
HIGH SPEED WEB OR PAPER FEEDER

Filed June 28, 1965  4 Sheets-Sheet 1

INVENTORS
GEORGE R. ADAMS
ROBERT M. MIHALEK

BY

AGENT

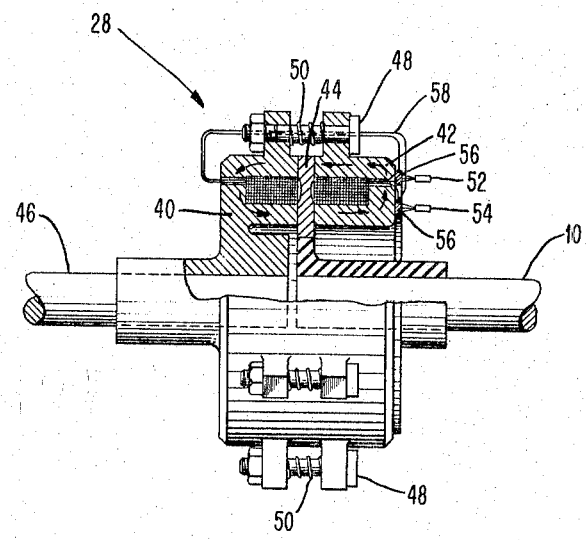

| | | CLUTCH 28 | BRAKE 32 | CLUTCH 30 | BRAKE 34 | SPEED |
|---|---|---|---|---|---|---|
| LINE AT A TIME CYCLE | DRIVE | ON | OFF | OFF | OFF | W1 |
| | STOP | OFF | ON | OFF | OFF | |
| SKIP CYCLE | DRIVE | OFF | OFF | ON | OFF | W2 |
| | STOP | OFF | ON | OFF | ON | |

FIG. 8

| | | 160 CLUTCH | 160B BRAKE | 162 CLUTCH | 162B BRAKE | 164 CLUTCH | 164B BRAKE | 166 CLUTCH | 166B BRAKE | SPEED |
|---|---|---|---|---|---|---|---|---|---|---|
| LINE AT A TIME CYCLE | DRIVE | ON | OFF | OFF | OFF | OFF | OFF | OFF | OFF | W1 |
| | STOP | OFF | ON | OFF | OFF | OFF | OFF | OFF | OFF | |
| SKIP CYCLE NO 1 | DRIVE | OFF | OFF | ON | OFF | OFF | OFF | OFF | OFF | W2 |
| | STOP | OFF | ON | OFF | ON | OFF | OFF | OFF | OFF | |
| SKIP CYCLE NO 2 | DRIVE | OFF | OFF | OFF | OFF | ON | OFF | OFF | OFF | W3 |
| | STOP | OFF | ON | OFF | ON | OFF | ON | OFF | OFF | |
| SKIP CYCLE NO 3 | DRIVE | OFF | OFF | OFF | OFF | OFF | OFF | ON | OFF | W4 |
| | STOP | OFF | ON | OFF | ON | OFF | ON | OFF | ON | | ns

United States Patent Office 3,315,860
Patented Apr. 25, 1967

3,315,860
HIGH SPEED WEB OR PAPER FEEDER
George R. Adams, Doylestown, and Robert M. Mihalek, Ambler, Pa., assignors to Sperry Rand Corporation, New York, N.Y., a corporation of Delaware
Filed June 28, 1965, Ser. No. 467,396
10 Claims. (Cl. 226—47)

The invention hereinafter described and claimed relates to high speed web feeders. More particularly it has to do with high speed paper advance apparatus for high speed printers wherein the paper may be advanced incrementally a line at a time or skip over a selected number of lines.

In the ever increasing press for faster speeds in every activity, the present invention provides an important step in the pursuit of faster paper advance speeds in high speed printers, such as used for computer output.

Not only is it necessary in such printers to step paper incrementally and intermittently one line at a time at high speed, it is even more necessary to feed it at higher speeds when lines are skipped, i.e., over non-printing lines, in order to reduce time loss between printing cycles. By way of example, assume a minimum time of W1 between consecutive lines of printing. Now consider the printing of consecutive connected invoices including four lines of printing and then a skip of eight lines to the next invoice. At the W1 rate, elapsed time for the twelve lines will be 12 W1, each skipped line taking as much time as each printed line. Obviously, time can be saved by moving the paper at a faster rate through the eight non-printing lines. Paper speed increase by a factor of four, for example, during this period would realize a time saving of 6 W1. Multiplying this over only an eight-hour period of continuous use, the printer output would be increased considerably when using a normal paper speed of 20″/sec. for line by line printing.

It is, therefore, the primary object of the present invention to provide improved apparatus for feeding a web selectively at one of a plurality of high speeds either intermittently or continuously.

Another object of the invention is to provide such apparatus for advancing paper in a printer intermittently one line at a time, or skipping over a selected number of lines at one of a plurality of high speeds.

A further object of the invention is to provide improved paper advance apparatus wherein paper may be advanced selectively one line at a time at one speed or continuously over two or more lines at one of a number of selectable higher speeds and yet stopped in one line space.

Still another object of the invention is to provide paper advance apparatus which is characterized by its simplicity and reliability of operation.

In accordance with the above and first briefly described, the present invention contemplates at least one pair of driving elements coupled together for moving a web, particularly of paper. One of the elements is connected to means for driving it, and therefore both elements, at one speed, while the other is connected to means for driving it, and consequently both elements, at a higher speed. The connecting means comprises clutch-brake combinations wherein the movement of the paper may reliably be controlled at the one speed to move a line at a time or at the higher speed for more than one line, and yet stop the paper in the space of one line. A plurality of higher speeds may be provided by additional drive means connected to said driving elements by clutch-brake combinations, all as brought out in more detail in the following description of the preferred embodiment of the invention.

In the drawings:

FIGURE 3 is an elevational view partially in section of a magnetic clutch or brake of the type used in the apparatus of FIGURE 1;

FIGURE 6 is a chart of the operating sequence of the apparatus shown in FIGURE 1;

FIGURE 8 is a chart of the operating sequence of the apparatus shown in FIGURE 2.

Figure 1:
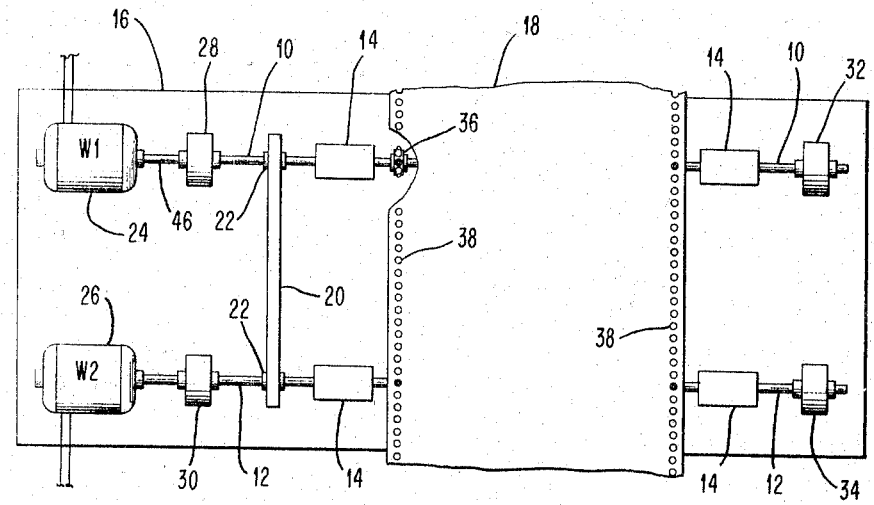
FIGURE 1 is a partly schematic view of apparatus embodying the invention.

Now with reference to the details of the drawings and first to FIGURE 1, it is seen that this preferred embodiment of the invention comprises a pair of drive shafts 10 and 12 arranged in spaced parallel relation and journalled in bearing blocks 14 fixed to the printer 16 on opposite sides of the path of movement of the paper web 18. A timing belt 20 threaded over sprockets 22 interconnect the shafts 10 and 12 for simultaneous rotation at the same speed, as described hereinafter.

The shafts are arranged to be driven selectively on signal at different speeds W1 and W2 by motors 24 and 26 respectively through electromagnetic clutches 28 and 30 (FIGURE 3) at the left hand ends of the respective shafts. Electromagnetic brakes 32 and 34, as described later in connection with FIGURE 3, are arranged at the opposite ends of the shafts to stop their rotation upon signal.

The paper is driven at the speed of the particular driving shaft by means of a pair of sprockets 36 mounted on each shaft, the teeth of which engage the holes 38 arranged along the opposite edges of the paper.

In this embodiment let it be assumed that shaft 10 is driven by its motor at a speed designated W1 while shaft 12 is driven by its motor at twice the speed of shaft 10, and designated W2. By way of example, speed W1 may be twenty inches per second for line by line printing. Speed W2 then is forty inches per second for skipping one or more lines. Thus, where no printing is to take place there is no loss of printer time for skipping one line, and loss of such time is reduced one-half the normal printing time when more than one line is skipped at that speed. Line by line printing at twenty inches per second will produce nine-hundred and twenty-two (922) lines per minute, approximately fifteen point three (15.3) per second.

When printing on consecutive lines, clutch 28 and brake 32 are cycled, on and off, by means to be described later, to move the paper incrementally and sequentially one line at a time at the speed motor 24 rotates shaft 10 (W1). At this speed, brake 32 is sufficient to stop the paper accurately in one line space.

When a blank or skipped line is programmed, clutch 30 is engaged, instead of clutch 28, to move the paper at twice the speed (W2) through this line, and then with the disengagement of clutch 30 both brakes 32 and 34 are engaged simultaneously to stop the paper in one line space. It will be understood, of course, that more than one line can be skipped at the W2 speed and the paper stopped within the space of one line by the two brakes. The cycling of the clutches and brakes in this embodiment of the invention are charted in FIGURE 6.

The electromagnetic clutches may be of any suitable type, such as shown in FIGURE 3, by way of example. This clutch comprises a pair of electromagnets 40 and 42 positioned on opposite sides of a light disc 44 fixed to the left hand end of shaft 10. Only the outer peripheral portion of the disc is of magnetic material to cooperate with the magnets 40 and 42 to form the magnetic path, shown by the arrows, when the magnets are energized. Electromagnet 40 is secured to motor shaft 46, and by means of screws 48 of non-magnetic material carries the electromagnet 42. Both electromagnets are rotated simultaneously by the motor shaft 46. When de-energized both magnets are maintained in light non-driving contact with the disc 44 by the springs 50 on screws 48. Contact brushes 52 and 54 are in wiping contact with conductor rings 56 on magnet 42 for energizing both magnets simultaneously through wire conductors 58. When so energized, the magnets are brought into driving contact with the opposite faces of disc 44 against the pressure of springs 50.

The electromagnetic brakes may be similarly constructed, it being only necessary to fix the magnets 40 and 42 against rotation. Friction on the low inertia disc 44 affixed to the rotating shaft 10 then stops the system. Alternatively, the brakes could be constructed in accordance with any other of the well known electromagnet brakes, well known in the art.

Figure 4:
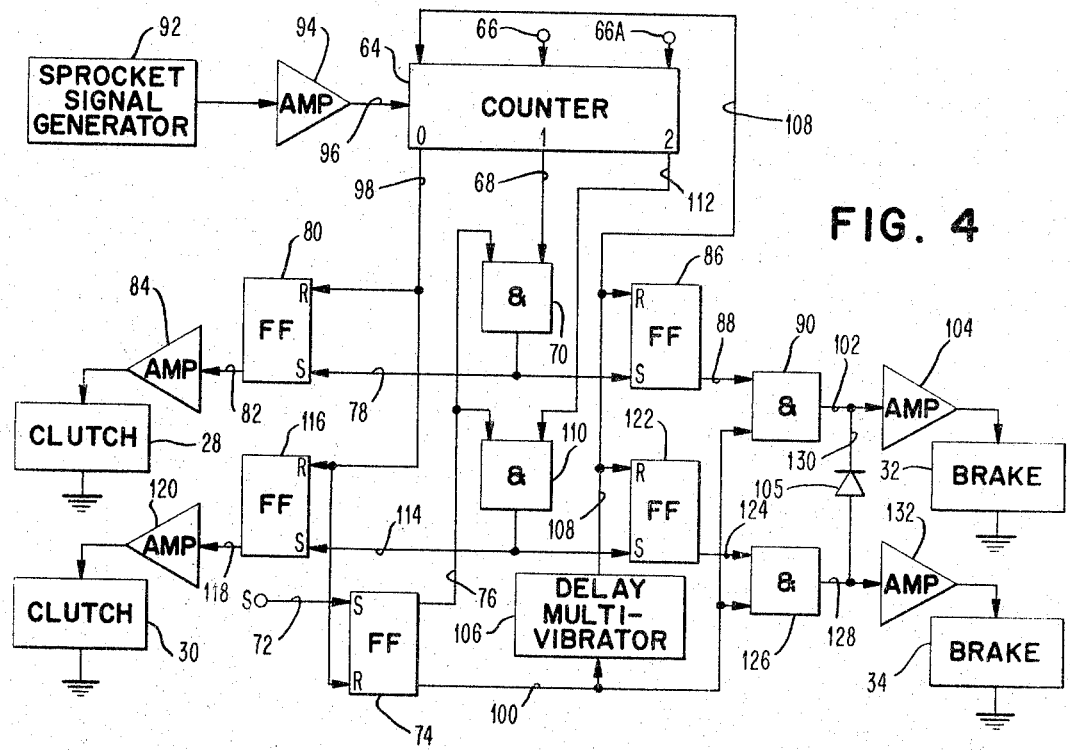
FIGURE 4 is a logic diagram of a circuit for operating the apparatus of the invention, according to FIGURE 1.

Operation of the system according to FIGURE 1 may be realized by any suitable circuitry, which could be such as that shown in the logic diagram of FIGURE 4, to which reference should now be had.

Let it be assumed that a line feed instruction of one, for line by line printing, is programmed into the counter 64 from a computer (not shown) over wire 66, when all flip-flops in the circuit are in their "reset" condition. This signal is fed over wire 68 to AND gate 70. When the logic circuits initiate a paper feed command over wire 72 at the bottom of the figure, flip-flop 74 flips to its "set" condition forwarding a signal over wire 76 to AND gate 70 which cooperates with the signal over wire 68 to fully condition this gate. The resultant output over wire 78 flips the flip-flop 80 to send a signal through wire 82 and amplifier 84 to enable clutch 28. The signal from AND gate 70 also sets flip-flop 86 which sends a signal over wire 88 to AND gate 90, but this gate is blocked by the set condition of flip-flop 74.

Each line of paper transport produces a count in the line counter by means of a signal from the sprocket signal generating device 92 and amplifier 94 over wire 96. This count reduces the line counter 64 from "one" to "zero," at which time flip-flops 80 and 74 are reset by a signal over wire 98. This effects the release of clutch 28 and sends a signal from flip-flop 74 over wire 100 to AND gate 90 cooperating with the signal from flip-flop 86 to fully condition the gate to forward a signal through wire 102 and amplifier 104 to enable brake 32 to stop the paper for printing. Diode 105 prevents brake 34 from being energized with brake 104 at the W1 speed. The signal from flip-flop 74 also energizes a delay multivibrator 106 over wire 100 and after a suitable delay to permit braking, forwards a signal over wire 108 to reset flip-flop 86 thus to release the brake 32. The cycle repeats itself upon receiving a new signal at flip-flop 74 over wire 72.

At certain intervals it might be desirable to skip a line of printing, to set off paragraphs, for example. In this case a line feed instruction of "two" is programmed into counter 64 over wire 66A. All flip-flops are again in their normal reset condition. When the logic circuits initiate a paper feed command over wire 72, flip-flop 74 flips to its set condition sending a signal over wire 76 to AND gate 110 which coincides with the signal over wire 112 from counter 64 to fully condition gate 110 to forward a signal over wire 114 causing flip-flop 116 to flip to its set condition and forward a signal over wire 118 through power amplifier 120 to energize clutch 30. As the paper is transported at speed W2 each line produces a count into the line counter by sprocket pulse generator 92. This count reduces the line counter to zero at which time flip-flops 116 and 74 are reset by a signal over the wire 98. Clutch 30 is de-energized and brakes 32 and 34 energized through the signal from flip-flop 74 over wire 100. Coincidence of this signal with one from flip-flop 122 over wire 124 at AND gate 126 conditions this last gate to forward the braking signal to both brakes 32 and 34 over wires 128 and 130, and amplifiers 132 and 104. The delay multivibrator 106 is also energized by the signal from flip-flop 74 and after a suitable delay to permit braking, forwards a signal over wire 108 to reset flip-flop 122 thus releasing the brakes for the next paper feed cycle, which in this case returns to the W1 speed for line at a time printing.

Figure 5:
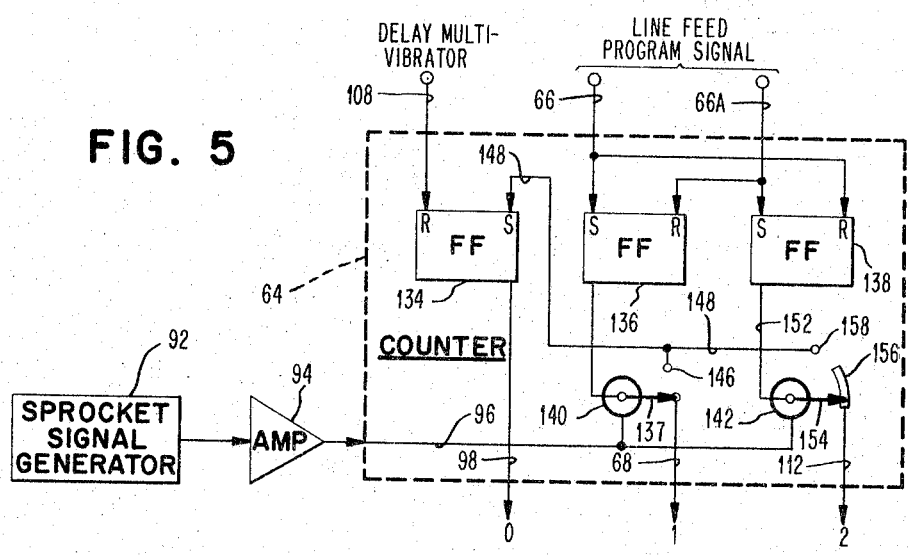
FIGURE 5 is a logic diagram of a counter such as may be used in the circuit of FIGURE 4.

The circuit components are all well known in the art and a more detailed description of them is not considered necessary to a complete understanding of the present invention. Therefore such description for the most part has been omitted. By way of example, however, counter 64 in FIGURE 4 could be constructed as shown in FIGURE 5, the wires 98, 68 and 112 being the same in both figures.

This counter comprises three flip-flops 134, 136 and 138, and two stepper switches 140 and 142. These switches, of course, may be substituted with more sophisticated electronic devices, but they will suffice for present purposes. During a line by line printing program the signal comes in over wire 66 to set flip-flop 136 to forward a signal to the stepper arm 137 of switch 140 from which it is conducted via wire 68 to AND gate 70, as seen in FIGURE 4. Upon receiving a signal from sprocket signal generator 92 over wire 96, arm 137 is stepped counterclockwise to contact 146 forwarding a signal over wire 148 to set flip-flop 134 and thus direct a signal over wire 98 to reset flip-flop 74, as described above in connection with FIGURE 4. Flip-flop 134 is reset simultaneously with flip-flops 86 and 122 over wire 108 from the delay multivibrator 106.

Similarly, when a line feed speed of W2 is programmed, its signal goes to flip-flop 138 over wire 66A thus to flip it to its "set" condition and forward a signal over wire 152 to the arm 154 of stepper 142 from which it is conducted over wire 112 to flip-flop 110 (FIGURE 4). Sprocket pulses from generator 92 cause arm 154 to make two steps corresponding to printing lines. On the first step it remains on contact strip 156. Its second step moves it to contact 158 sending a signal over wire 148 to flip-flop 134 for a braking function, as described above in connection with FIGURE 4. It is noted that line feed instruction signals in either of wires 66 and 66A resets the opposite flip-flop 138 and 136 respectively. The stepper arms 137 and 154 spring back to their original positions by spring means not shown.

Thus, it is seen that by the proper programming of the clutches and brakes the paper 18 may be moved incrementally and intermittently a line at a time at speed W1, or skip lines at a speed of W2, yet stop the paper movement within one line space.

Figure 2:
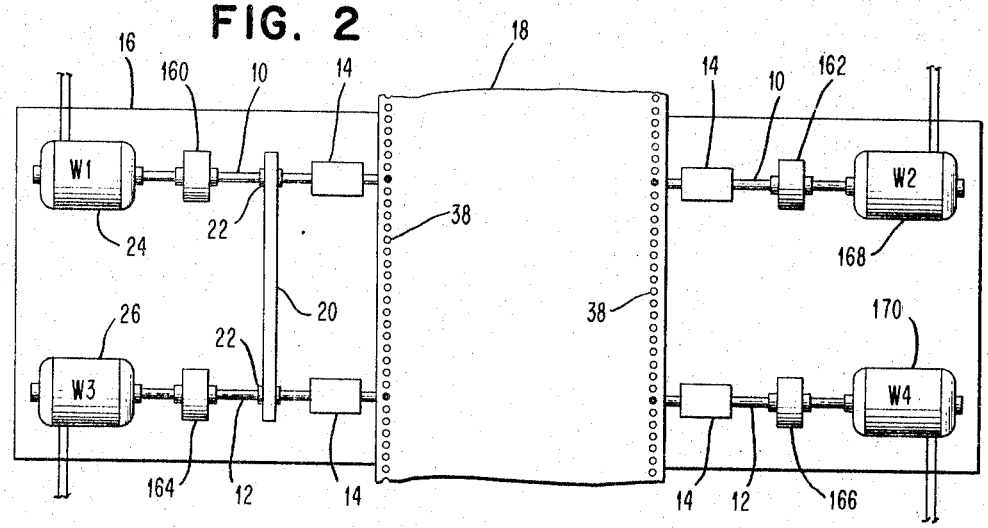
FIGURE 2 is a view similar to FIGURE 1, but illustrating a modified form of the invention.

Turning now to FIGURE 2 it will be seen how the invention contemplates the additional speeds W3 and W4, whereby the paper may be moved at three and four times the line by line speed. It should be understood throughout that the speeds are not necessarily multiples of the W1 speed, but can be varied by changing the speed of any or all of the motors as will be evident as the description progresses.

In most respects this figure resembles FIGURE 1. However, the individual clutches and brakes of the previously described figure have been changed to electromagnetic clutch/brake combinations, here identified by the reference characters 160, 162, 164 and 166. In addition, motors 168 and 170 have been provided at the right hand ends of shafts 10 and 12. These motors combined with motors 24 and 26 with their associated clutch/brakes provide the means to drive the shafts at the four different speeds W1–W4 as indicated on each motor.

Unitary electromagnetic clutch/brake mechanisms are well known in the art and a detailed description thereof is considered redundant to a full understanding of this form of the invention. However, reference may be had to Patent No. 3,154,727 for the details of such a mechanism suitable for this purpose.

As charted in FIGURE 8, speed W1 for line by line paper movement, is obtained by energizing (turning on) clutch 160 with all other clutches and brakes deenergized (turned off). To stop the paper, clutch 160 is turned OFF and brake 160B turned ON, all others remain OFF. Each additional speed is obtained by turning ON the appropriate clutch, as indicated on the chart, with all others OFF. Stopping at the increased speeds is by turning OFF the clutch and turning ON the indicated brakes, 160 and 162 for W2 speed, 160, 162 and 164 for W3 speed, and all four brakes for the W4 speed. This cycling of the various clutch/brake mechanisms enables the paper to be moved selectively through one, two, three or four line skips at the respective speeds indicated, and yet stopped in one line space. Alternatively the paper may be moved continuously at either of the speeds depending upon the programmed instruction.

Figure 7:
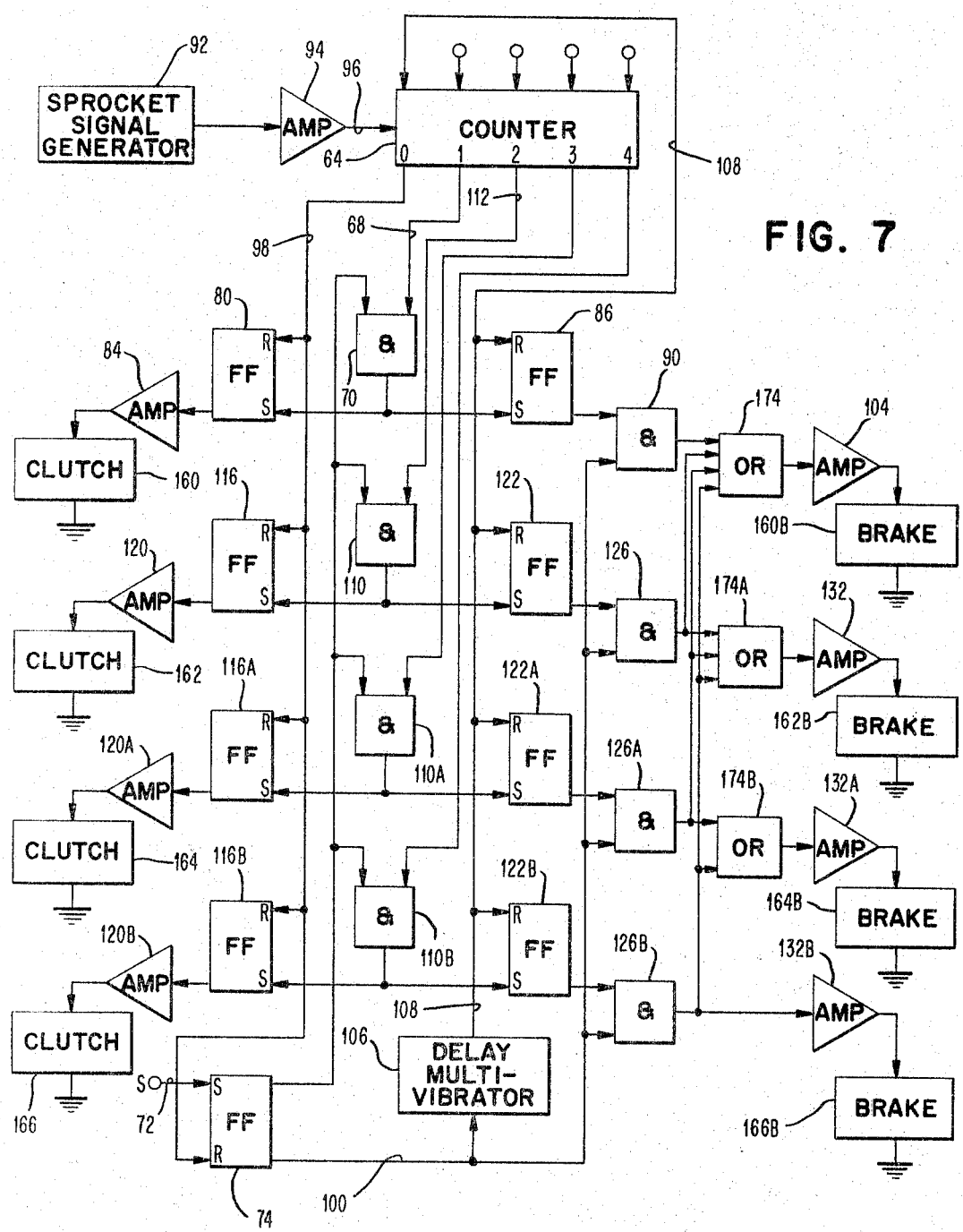
FIGURE 7 is a logic diagram of a circuit for operating the apparatus of the invention according to FIGURE 2.

As seen in FIGURE 7, the circuit for this form of the invention is an amplified version of that shown in FIGURE 4, described above in connection with FIGURE 1. The logic diagrammed here clearly shows how the various clutches and brakes are turned ON and OFF according to the schedule in the chart of FIGURE 8.

In this case the counter 64 would include additional flip-flops and stepper switches with inputs 66C and 66D, and output wires 170 and 172 for the three and four line skip speeds W3 and W4. These wires forward the signals to their respective clutch and brake combinations through AND gates, flip-flops and amplifiers identified by the same preferred characters as those used for the two line skip, but with the subscripts A and B, respectively. OR gates 174, 174A and 174B are employed to operate the brakes, as described above.

The embodiments of the invention in which an exclusive property or privilege is claimed are defined as follows:

1. Web advance apparatus comprising:
   (A) a pair of spaced rotatable driving elements for engaging and driving the web;
   (B) means interconnecting said elements for simultaneous rotation at the same speed;
   (C) means for rotating one of said drive elements at one speed whereby the other element is driven at said one speed through said interconnecting means;
   (D) means for rotating the other of said drive elements at another and higher speed whereby the said one element is also driven at said higher speed through said interconnecting means;
   (E) normally inoperative clutch means for each of said drive elements whereby each may selectively be drivingly engaged with its rotating means; and
   (F) means for selectively activating each of said clutch means thus selectively to advance said web at one or the other of said speeds by its drive element through said interconnecting means.

2. Web advance apparatus according to claim 1, and further including:
   (A) brake means for each of said web driving elements;
   (B) means for activating the brake means of said one element and simultaneously deactivating its clutch means; and
   (C) means for activating both of said brake means and simultaneously deactivating the other of said clutch means.

3. Apparatus according to claim 2 for use in high speed printers, and further including:
   (A) means for cycling said clutch and brake means of said first driving element intermittently and oppositely on and off, whereby the web is intermittently advanced one line at a time at said one speed; and
   (B) means for cycling said clutch means of said other driving element and said brake means of both of said elements, on and off, whereby the web is advanced intermittently or continuously for two or more lines at said higher speed and stopped in one line space.

4. Web advance apparatus according to claim 2 wherein:
   (A) said clutch and brake means are electro-magnetically operated.

5. High speed paper advance apparatus for high speed printers, comprising:
   (A) a pair of spaced apart elongated drive shafts mounted parallel to each other;
   (B) means on each of said shafts for drivingly engaging a web of paper;
   (C) means for driving one of said shafts at one speed;
   (D) means for driving the other of said shafts at a higher speed;
   (E) an electromagnetic clutch on one end of each of said shafts for selectively interconnecting, or disconnecting said shafts to or from its drive means;
   (F) normally inoperative electromagnetic brake means on the other end of each of said shafts for permitting or stopping rotation of said shafts selectively;
   (G) means drivingly interconnecting said shafts whereby rotation of either will rotate the other at the same speed; and
   (H) electrical means for cycling the clutch and brake means of said one shaft, on and off, intermittently and oppositely, whereby the paper is intermittently advanced by both paper engaging means one printing line at time at said one speed;
   (I) said electrical means including means for cycling the clutch means of said other shaft, and both of said brake means simultaneously, oppositely on and off, whereby the paper may be advanced two or more lines intermittently by both of said paper engaging means and stopped by both of said brake means.

6. High speed paper advance apparatus for high speed printers, comprising:
   (A) first and second elongated drive shafts rotatably mounted in spaced parallel relation;
   (B) paper engaging drive means mounted on each of said shafts;
   (C) means interconnecting said shafts for simultaneous rotation at the same speed;
   (D) means for rotating said first shaft selectively at a first or a second speed;
   (E) means for rotating said second shaft at a third speed;
   (F) clutch means for coupling or uncoupling each of the rotating means with its shaft selectively, whereby said paper can be advanced at either of the speeds;
   (G) brake means for stopping rotation of the shafts;
   (H) means for actuating said clutch and brake means intermittently and oppositely, on and off, to effect advance of said paper intermittently a line at a time at said first speed for line by line printing, or at any of the other speeds for two or more lines for skipping printing lines at the higher speeds.

7. High speed paper advance apparatus for high speed printers, comprising:
   (A) first and second elongated drive shafts rotatably mounted in spaced parallel relation;
   (B) paper engaging drive means mounted on each of said shafts;
   (C) means interconnecting said shafts for simultaneous rotation at the same speed;
   (D) means at one end of said first shaft for rotating it at a first speed;
   (E) means at the other end of said first shaft for rotating it at a second speed higher than the first speed;
   (F) means at one end of said second shaft for rotating it at a third speed higher than the second speed;
   (G) means at the other end of said second shaft for rotating it at a fourth speed higher than said third speed;

(H) clutch means for coupling or uncoupling each of the rotating means with its shaft selectively, whereby said paper can be advanced at either of the speeds;
(I) brake means for stopping rotation of the shafts;
(J) means for actuating said clutch and brake means intermittently and oppositely, on and off, to effect advance of said paper intermittently a line at a time at said first speed for line by line printing, or at any of the other speeds for two or more lines for skipping printing lines at the higher speeds.

8. High speed paper advance apparatus for high speed printers, comprising:
(A) first and second elongated drive shafts rotatably mounted in spaced parallel reation;
(B) paper engaging drive elements mounted on each of said shafts;
(C) means interconnecting said shafts for simultaneous rotation at the same speed;
(D) first drive means at one end of said first shaft for rotating it at a first speed;
(E) second drive means at the other end of said first shaft for rotating it at a second speed twice that of the first speed;
(F) third drive means at one end of said second shaft for rotating it at a third speed three times that of the first speed;
(G) fourth drive means at the other end of said second shaft for rotating it at a fourth speed four times that of the first speed;
(H) clutch means for coupling or uncoupling each of the shaft drive means with its shaft selectively, whereby said paper can be advanced at either of the four speeds;
(I) brake means for each shaft drive means for stopping rotation of the shafts in one line space;
(J) means for actuating said clutch and brake means selectively intermittently and oppositely, on and off, to effect advance of said paper intermittently by said paper drive elements a line at a time at said first speed for line by line printing, or at one of the other speeds for skipping one, two or three printing lines selectively at higher speeds yet stopping its advance in one line space.

9. Apparatus according to claim 8 wherein said means for actuating said clutch and brake means comprises:
(A) electrical means effective to:
(a) cycle the clutch and brake means of said first drive means on and off for line by line advance of the paper;
(b) cycle the clutch of said second drive means and simultaneously the brakes of said first and second drive means on and off for skipping at least one line of printing at said second speed and stopping the paper advance in one line space;
(c) cycle the clutch of said third drive means and simultaneously the brakes of said first, second and third drive means on and off for skipping at least two lines of printing at said third speed and stopping the paper advance in one line space; and
(d) cycle the clutch of said fourth drive means and simultaneously the brakes of all four shaft drive means on and off for skipping at least three lines of printing at said fourth speed and stopping the paper advance in one line space.

10. Apparatus according to claim 9 wherein:
(A) said clutch and brake means comprises unitary combined electromagnetic clutch-brakes.

References Cited by the Examiner
UNITED STATES PATENTS

| | | | |
|---|---|---|---|
| 2,055,124 | 9/1936 | Farrand | 226—188 X |
| 2,707,618 | 5/1955 | Brown | 74—661 |
| 3,127,790 | 4/1964 | Howey | 74—661 |
| 3,147,900 | 9/1964 | Konkel | 226—111 |

M. HENSON WOOD, JR., *Primary Examiner.*
J. N. ERLICH, *Assistant Examiner.*